(12) United States Patent
Kanda

(10) Patent No.: US 9,677,943 B2
(45) Date of Patent: Jun. 13, 2017

(54) POLARIZATION VELOCITY VECTOR MEASURING APPARATUS AND POLARIZATION VELOCITY VECTOR MEASURING METHOD

(71) Applicant: Oki Electric Industry Co., Ltd., Tokyo (JP)

(72) Inventor: Yoshihiro Kanda, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 15/215,323

(22) Filed: Jul. 20, 2016

(65) Prior Publication Data
US 2017/0122809 A1    May 4, 2017

(30) Foreign Application Priority Data
Oct. 28, 2015 (JP) .................................. 2015-211709

(51) Int. Cl.
*G01J 4/00* (2006.01)

(52) U.S. Cl.
CPC ............ *G01J 4/00* (2013.01); *G01J 2004/008* (2013.01)

(58) Field of Classification Search
CPC ....................................................... G01J 4/00
USPC ......................................................... 356/367
See application file for complete search history.

(56) References Cited

U.S. PATENT DOCUMENTS 6,380,533 B1 * 4/2002 Jopson ................. G01M 11/336
250/225

OTHER PUBLICATIONS

Leon Yao et al., "A novel scheme for achieving quasi-uniform rate polarization scrambling at 752 krad/s," Optics Express, vol. 20, No. 2 (2012), pp. 1691-1699, Jan. 11, 2012.
P. J. Leo et al., "State of Polarization Changes: Classification and Measurement," IEEE Journal of Lightwave Technology, vol. 21, No. 10, 2003, pp. 2189-2193, Oct. 2003.
R. M. Jopson et al., "Measurement of Second-Order Polarization-Mode Dispersion Vectors in Optical Fibers," IEEE Photonics Technology Letters, vol. 11, No. 9, (1999), pp. 1153-1155, Sep. 1999.

* cited by examiner

*Primary Examiner* — Roy M Punnoose
(74) *Attorney, Agent, or Firm* — Rabin & Berdo, P.C.

(57) ABSTRACT

A PV vector measuring apparatus includes: a light source 101 configured to output probe light; a polarization switch 102 that can freely set a state of polarization of input light; a polarimeter 104; a PV-vector calculating device 105; and a rectangular wave generator 106. The polarization switch alternately switches between two orthogonal states of polarization in accordance with a rectangular wave modulation signal output from the rectangular wave generator. Output light from the polarization switch is input to a measurement object 103. The polarimeter 104 measures time dependency of an SOP vector of output light output from the measurement object. The PV-vector calculating device calculates a characteristic vector, which expresses a rate of polarization change in the measurement object, from the time dependency of the SOP vector.

5 Claims, 8 Drawing Sheets

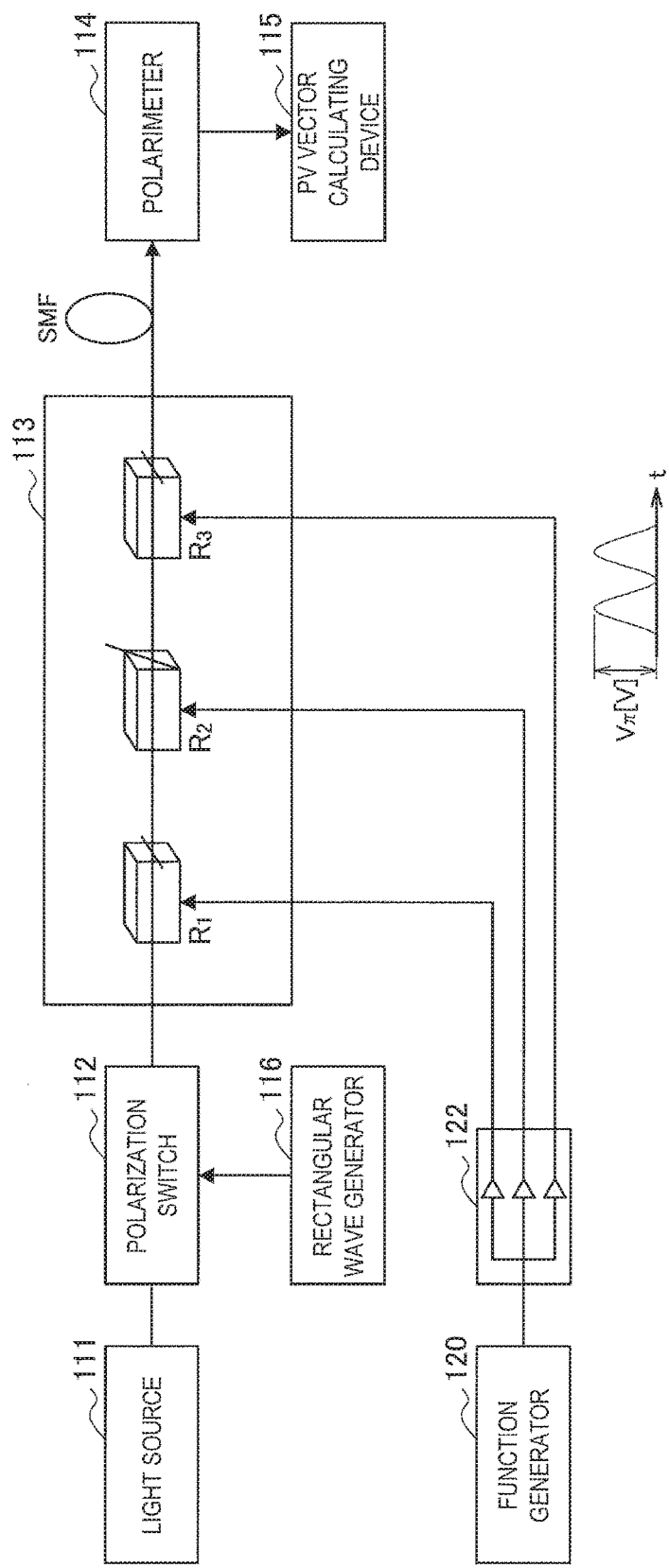

POLARIZATION VELOCITY VECTOR MEASURING APPARATUS AND POLARIZATION VELOCITY VECTOR MEASURING METHOD

CROSS REFERENCE TO RELATED APPLICATION(S)

This application is based upon and claims benefit of priority from Japanese Patent Application No. 2015-211709, filed on Oct. 28, 2015, the entire contents of which are incorporated herein by reference.

BACKGROUND

The present invention relates to polarization velocity vector measuring apparatuses that measure polarization change characteristics with respect to, for example, optical fibers without being dependent on the states of polarization of measurement probe light, and to polarization velocity vector measuring methods that utilize such apparatuses.

In digital coherent reception technology, a high-speed polarization demultiplexing and waveform equalizing function are achieved so that reception of a modulation format using a polarization space has become possible. However, the state of polarization (SOP) of light input to an optical-fiber transmission path changes in response to a perturbation, such as slight vibration of this optical-fiber transmission path. This has to be dealt with by evaluating a change in the SOP of a received optical signal observed at the output end of the optical-fiber transmission path in a digital coherent transmission system.

The main factor for a change in the SOP observed at the output end of the long-distance optical-fiber transmission path is a temporal change in birefringence caused by stress distributed to the optical-fiber transmission path. Since the stress distributed to the optical-fiber transmission path changes irregularly due to, for example, a temperature change or vibration, the SOP observed at the receiving side changes randomly. Moreover, the rate of change in the SOP is not fixed, but changes statistically.

Due to the above reasons, in the evaluation of a practically-used optical-fiber transmission path, the possibility of observation of the rate of change in the SOP (i.e., rate of polarization change) and the possibility of emulation in a test room that provides an assumed environment similar to that of an actually-installed optical-fiber transmission path are important research issues for the evaluation technology of optical-fiber transmission paths.

In the related art, two methods have been employed as methods for quantifying a change in the SOP. The first method involves measuring a rate of temporal change $\partial\alpha/\partial t$ (rad/s) in angle $\alpha = \cos^{-1}[\vec{s}_{out}(t) \cdot \vec{s}_{out}(t+\Delta t)]$ formed by two SOP vectors $s_{out}(t)$ and $s_{out}(t+\Delta t)$ (for example, see L. Yao, H. Huang, J. Chen, E. Tan, and A. Willner "A novel scheme for achieving quasi-uniform rate polarization scrambling at 752 krad/s," Optics Express, Vol. 20, No. 2 (2012), pp. 1691-1699 (which will be referred to as "Non Patent Literature 1" hereinafter)). In this case, the SOP vectors are Stokes vectors. The second method involves measuring $\partial r/\partial t = [(\partial\sigma/\partial t)^2 + (\partial\theta/\partial t)^2]^{1/2}$ (rad/s) based on an amount of change $\sigma$ on the equator and an amount of change $\theta$ on the diameter in a coordinate system $(1, \sigma, \theta)$ of a Poincaré sphere having a radius of 1 (for example, see P. J. Leo, G. R. Gray, G. J. Simer, and K. B. Rochford, "State of Polarization Changes: Classification and Measurement," IEEE Journal of Lightwave Technology, Vol. 21, No. 10, 2003, pp. 2189-2193 (which will be referred to as "Non Patent Literature 2" hereinafter)).

SUMMARY

The methods for quantifying a change in the SOP in the related art disclosed in Non Patent Literatures 1 and 2 are both based on the measurement of the rate of change in the changing angle of an SOP vector with respect to a small change in time. An SOP vector of output light output from a device under measurement is dependent on the SOP of measurement probe light. Therefore, a value obtained in accordance with each of the SOP-change quantifying methods in the related art is dependent on the SOP of measurement probe light.

The inventors of the present application have focused on a polarization velocity vector (PV vector) which acts as an indicator that provides polarization change characteristics of a measurement object itself without being dependent on the SOP of measurement probe light. Even an optical fiber with temporally-changing birefringence distributed therein has orthogonal birefringent axes at any instant, and the phenomenon of a polarization change superficially observed in an output can be completely described in accordance with both variations of birefringent axes and phase difference between the axes (phase-retardation). The PV vector is a 3-by-1 real vector in the Stokes space. Its magnitude equals to the possible maximum rate of change in the SOP (rad/s) for any input SOP of the probe light, and the direction equals to the one of the polarizing vector of the time-varying birefringence in the Stokes-space.

This PV vector is the properties of the optical fiber itself as its inherent properties even if light is not input to the optical fiber. This PV vector v(t) is determined in accordance with formula (A) below from Stokes vectors $s_i$ and $s_j$. The Stokes vectors $s_i$ and $s_j$ provide the SOP of the output light output from the measurement object in correspondence with two orthogonal beams of polarization input probe light.

$$v(t) = \frac{\frac{\partial \vec{s}_i(t)}{\partial t} \times \frac{\partial \vec{s}_j(t)}{\partial t}}{\frac{\partial \vec{s}_i(t)}{\partial t} \cdot \vec{s}_j(t)} \tag{A}$$

Since birefringence that temporally changes in a random manner is distributed in an actual optical fiber, the phase difference between birefringent axes (phase-retardation) and the direction of the axes of this optical fiber are also random with respect to time. Therefore, the magnitude and the direction of the PV vector v are also indicates a random with respect to time in the Stokes space.

The PV vector v is calculated from the time dependency of the two SOP vectors of the output lights output from the measurement object. Specifically, the PV vector v is not determined in accordance with an SOP output of measurement probe light input to the measurement object, but expresses the polarization change characteristics of the measurement object as a change in phase difference occurring between orthogonal polarizing axes at each instant. Therefore, the PV vector is not dependent on the SOP of probe light input to the measurement object, but acts as an indicator that provides the polarization change characteristics of the measurement object itself.

However, in the PV vector measuring method, which utilizes a PV vector, focused on by the inventors of the present application, if the denominator of formula (A) that provides the PV vector becomes zero, the PV vector becomes a singular point and thus cannot be determined. Moreover, even when the denominator is close to zero, the PV vector cannot be accurately determined since a large measurement error occurs.

When measurement probe light is input to an optical fiber in which birefringence that temporally changes in a random manner is distributed, the tip end of a vector $s_i(t)$ expressing the output state of polarization thereof changes randomly on a Poincaré sphere. Thus, the direction of the PV vector v of the optical fiber may undesirably match the direction of the Stokes vector $s_i(t)$ that provides the SOP of output light. In this case, $s_i(t)$ of the output light does not temporally change relative to a change in birefringence, and $\partial s_i(t)/\partial t$ appearing at the denominator of formula (A) becomes zero, resulting in a singular point.

It is desirable to provide a PV vector measuring apparatus and a PV vector measuring method that can measure a PV vector without including a singular point.

A PV vector measuring apparatus according to an embodiment of the present invention includes: a light source configured to output probe light; a polarization switch; a polarimeter; and a PV-vector calculating device. The polarization switch alternately switches between two orthogonal states of polarization of the probe light and output measurement probe light. The polarimeter measures time dependency of an SOP vector of output light output from a measurement object that has received the measurement probe light. The PV-vector calculating device calculates a characteristic vector, which expresses a rate of polarization change in the measurement object, from the time dependency of the SOP vector. The PV-vector calculating device calculates a PV-vector outer-product operator vx provided by a formula below from a Mueller matrix R(t) of the measurement object and determines a PV vector v ($v_1$, $v_2$, $v_3$) from a matrix component that provides the PV-vector outer-product operator.

$$\vec{v} \times = \left\{ \frac{\partial}{\partial t} R(t) \right\} R^\dagger(t) = \begin{bmatrix} 0 & -v_3 & v_2 \\ v_3 & 0 & -v_1 \\ -v_2 & v_1 & 0 \end{bmatrix}$$

A PV vector measuring method according to an embodiment of the present invention is executed in the PV vector measuring apparatus, the PV vector measuring method including first to fourth steps in the following order.

The first step is a step of inputting the probe light to the polarization switch, alternately switching a state of polarization of the probe light input to the polarization switch between two orthogonal states of polarization and outputting the measurement probe light, and inputting the measurement probe light to the measurement object.

The second step is a step of measuring time dependency of an SOP vector of output light output from the measurement object in an oscilloscope mode by using the polarimeter and storing the time dependency of the SOP vector into the PV-vector calculating device.

The third step is a step of determining time dependency of the SOP vector by splitting the SOP vector stored in the PV-vector calculating device into SOP vectors corresponding to the two orthogonal states of polarization of the measurement probe light, and determining a Mueller matrix R(t) of the measurement object from the time dependency of the SOP vector.

The fourth step is a step of calculating a PV-vector outer-product operator vx provided by a formula below from the Mueller matrix R(t) and determining a PV vector v ($v_1$, $v_2$, $v_3$) from a matrix component that provides the PV-vector outer-product operator.

$$\vec{v} \times = \left\{ \frac{\partial}{\partial t} R(t) \right\} R^\dagger(t) = \begin{bmatrix} 0 & -v_3 & v_2 \\ v_3 & 0 & -v_1 \\ -v_2 & v_1 & 0 \end{bmatrix}$$

In the PV vector measuring apparatus according to an embodiment of the present invention and the PV vector measuring method using this apparatus, the measurement probe light alternately switched between the two orthogonal states of polarization of the probe light is input to the measurement object, and the time dependency of the SOP vector of output light output from the measurement object is measured. The Mueller matrix R(t) of the measurement object is determined from this time dependency of the SOP vector. Then, the PV-vector outer-product operator vx is calculated from the Mueller matrix R(t), and the PV vector v ($v_1$, $v_2$, $v_3$) is determined from the matrix component that provides this PV-vector outer-product operator.

Therefore, in the PV vector measuring apparatus and the PV vector measuring method according to an embodiment of the present invention, even when the direction of the PV vector v matches the direction of the Stokes vector $s_i(t)$, which provides the SOP of the output light, and $\partial s_1(t)/\partial t$ becomes zero due to $s_i(t)$ of the output light not temporally changing relative to a change in birefringence, a PV vector can still be measured. In other words, a PV vector can be measured without including a singular point.

BRIEF DESCRIPTION OF THE DRAWINGS

FIG. 3 is a block diagram schematically illustrating the configuration of a PV vector measuring apparatus for explaining the contents and results of a test for demonstrating a PV vector measurement principle;

DETAILED DESCRIPTION OF THE EMBODIMENT(S)

Figure 1:
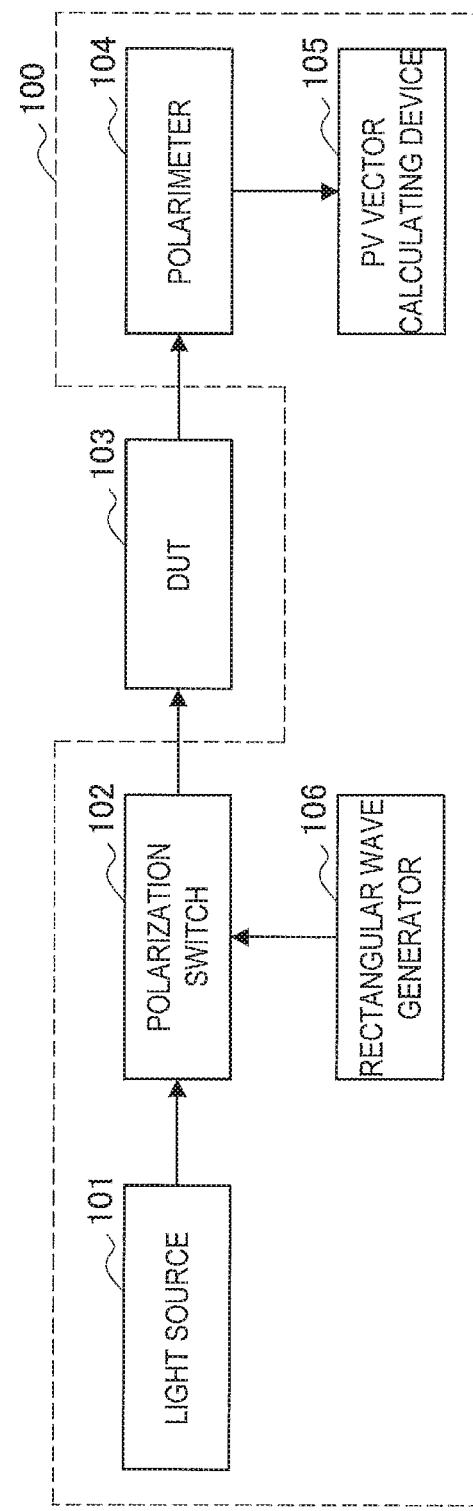
FIG. 1 is a block diagram schematically illustrating the configuration of a PV vector measuring apparatus according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted. Although, for example, specific elements and operating conditions may be covered in the following description, these elements and operating conditions are merely preferred examples and the present invention is not to be limited thereto. Moreover, although vector quantities will be covered in the description of this specification, a rightward arrow added above a character that expresses a vector quantity may sometimes be omitted to an extent that it does not induce confusion. When something should actually be written as, for example, v(t) to clarify that it is a function of time t, it may sometimes be written simply as v to an extent that it does not induce misinterpretation.

PV Vector Measuring Apparatus

A PV vector measuring apparatus 100 according to an embodiment will now be described with reference to FIG. 1. This PV vector measuring apparatus 100 has a light source 101 that outputs probe light, a polarization switch 102 that can alternately switch the state of polarization of input light between two different states of polarization relative to a temporal change, a polarimeter 104, a PV vector calculating device 105, and a rectangular wave generator 106. The probe light output from the light source 101 is input to the polarization switch 102. The polarization switch 102 alternately switches the state of polarization of the input probe light between two orthogonal states in accordance with a rectangular wave modulation signal output from the rectangular wave generator 106 and outputs measurement probe light.

A polarization rotator that imparts a birefringence change in accordance with an electro-optic effect is preferably used as the polarization switch 102. For example, a polarization rotator that uses lithium niobate can be used.

The output light from the polarization switch 102 is input to a measurement object (device under test: DUT) 103. The polarimeter 104 measures the time dependency of an SOP vector of the output light output from the measurement object 103. The PV vector calculating device 105 calculates a characteristic vector, whose magnitude expresses the possible maximum rate of polarization change in the measurement object 103, from the time dependency of the SOP vector.

The measurement object 103 may be, for example, an optical-fiber transmission path or an optical fiber sensor, which will be described later.

The switching period at which the polarization switch 102 alternately switches between the two orthogonal states of polarization is set to be sufficiently smaller than the time it takes for a polarization change assumed with respect to the measurement object 103.

The polarimeter 104 may be of any type that can observe the time dependency of the SOP vector in an oscilloscope mode so long as the measuring speed range thereof satisfies the sampling-theorem with respect to the rate of polarization change of the time dependency of the SOP vector from the measurement object 103. For example, in a case where POD-101D (with a sampling frequency of 625 kS/s) manufactured by General Photonics Corporation is used, the switching frequency at which the polarization switch 102 alternately switches between the two states of polarization may be about 312 kHz.

A commercially-available personal computer (PC) having installed therein software for calculating the characteristic vector (i.e., PV vector), which expresses the possible maximum rate of polarization change for any input SOP in the measurement object 103, from the time dependency of the SOP vector may be used as the PV vector calculating device 105.

PV Vector Measurement Procedure

In order to determine a PV vector (i.e., a change in phase difference occurring between orthogonal polarizing axes at every instant) of the measurement object 103 by using the PV vector measuring apparatus 100 illustrated in FIG. 1, the following four steps (i.e., first to fourth steps) are performed.

First Step

Output light from the light source 101 is input to the polarization switch 102.

The SOP of output light (i.e., measurement probe light) from the polarization switch 102 is alternately switched between two orthogonal states of polarization in synchronization with the period of a rectangular wave modulation signal output from the rectangular wave generator 106. Then, the output light from the polarization switch 102 is input to the measurement object 103.

Second Step

An SOP vector of the output light output from the measurement object 103 is measured by the polarimeter 104 in an oscilloscope mode and is stored into the PV vector calculating device 105.

Third Step

The SOP vector stored in the PV vector calculating device 105 is split into SOP vectors that correspond with the two orthogonal states of polarization of the measurement probe light. The measurement probe light in the two orthogonal states of polarization is input to the measurement object 103 at a switching rate of the polarization switch 102. Therefore, by synchronizing the PV vector calculating device 105 with the switching operation of the polarization switch 102, the SOP vector can be split in correspondence with the two orthogonal states of polarization of the measurement probe light. As a result, the time dependency of the SOP vector is determined. From this time dependency of the SOP vector, a Mueller matrix R(t) of the measurement object 103 is determined.

Fourth Step

A PV-vector outer-product operator "v×" is calculated from the Mueller matrix R(t), and a PV vector $v=[v_1(t), v_2(t), v_3(t)]^T$ is determined from matrix components that provide this PV-vector outer-product operator. A detailed description of the PV-vector outer-product operator "v×" will be provided later.

Figure 2A:
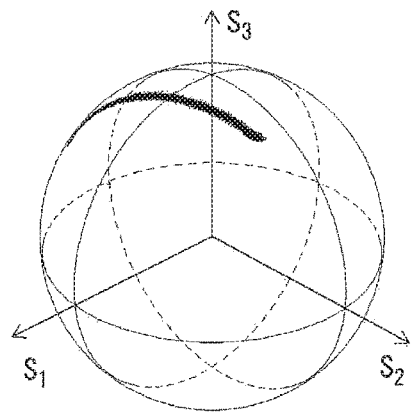
FIGS. 2A to 2C are diagrams illustrating a locus formed on a Poincaré sphere by a tip end of an SOP vector.

The results obtained in the first to third steps described above will now be described by using a Poincaré sphere with reference to FIGS. 2A to 2C. FIG. 2A illustrates a locus formed on the Poincaré sphere by the tip end of the SOP vector of the output light output from the polarization switch 102. The orthogonal states of polarization are alternately occurring from the polarization switch 102. The measurement probe light controlled to such states of polarization is input to the measurement object 103.

Figure 2B:
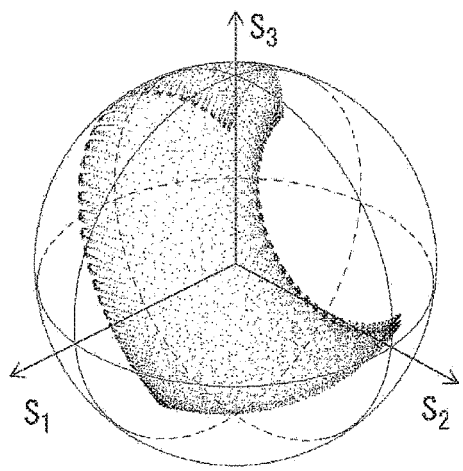
Figure 2C:
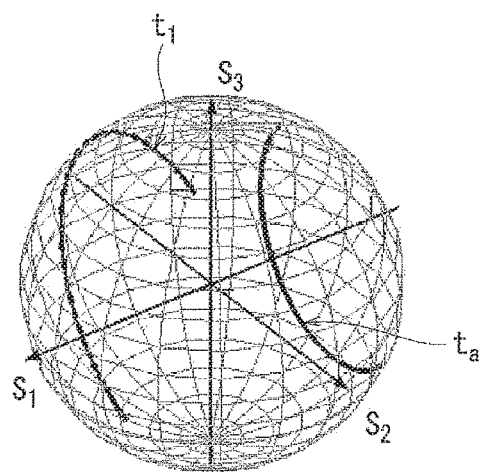

FIG. 2B illustrates a locus formed on the Poincaré sphere by the tip end of the SOP vector of the output light output from the measurement object 103. In FIG. 2B, instants (i.e., state-of-polarization instants between orthogonal states of polarization) other than instants corresponding to $t_1$ and $t_a$ illustrated in FIG. 2C are also plotted and are shown in the form of a lightly shaded belt on the Poincaré sphere. FIG. 2C illustrates a state where the SOP vector of the output light output from the measurement object 103 is split in correspondence with the two orthogonal states of polarization of the measurement probe light. In FIG. 2C, the opposite sides of the belt are extracted in the form of lines. In correspondence with the orthogonal states of polarization of the measurement probe light, a locus of an SOP vector $t_1$ of the output light input to and output from the measurement object 103 is indicated as $t_1$, and a locus of an SOP vector $t_a$ of the output light in the other state of polarization input to and output from the measurement object 103 is indicated as $t_a$.

By changing the wavelength of the light source 101, which outputs probe light, and determining a PV vector for each wavelength, the wavelength dependency of each PV vector can be measured. When measuring the wavelength dependency, a wavelength variable laser may be used as the light source 101, and a PV vector may be measured for each wavelength by controlling the wavelength of the wavelength variable laser. Alternatively, a broadband pulse laser may be used as the light source 101, and the wavelength may be scanned with an optical band pass filter in the prior stage of the polarimeter 104, so that a characteristic vector related to a polarization velocity provided by a broadband measurement object may be measured.

PV Vector

A PV vector, which is an important concept in the following description, will now be described. In this description, a PV vector will first be defined, and a PV vector measurement principle will be described after describing the relationship between a PV vector and an SOP vector.

A PV vector is a vector defined in Stokes space. This concept is based on the fact that orthogonal polarizing axes exist at any instant even in an optical fiber with temporally-changing birefringence distributed therein and that the phenomenon of a polarization change superficially observed in an output can be completely described in accordance with the polarizing axes and first-order time differentiation of the phase difference between the polarizing axes. A PV vector has a dimension corresponding to this first-order time differentiation of the phase difference and is a vector existing within the Stokes space and oriented in the direction of one of those polarizing axes.

An optical fiber is assumed here as a PV-vector measurement object. The birefringence of this optical fiber changes in response to external stress.

When measurement probe light is input to this optical fiber, the SOP of output light from the optical fiber changes as a function of time. The use of a Jones vector is convenient for mathematically expressing the SOP. A Jones vector is a two-dimensional vector and the components thereof are the complex amplitude of x and y polarization components. Furthermore, a Jones vector of input light and a Jones vector of output light are associated with each other in accordance with a two-by-two Jones matrix.

Assuming that the input light to the optical fiber is monochromatic light with an optical angular frequency of $\omega$, a Jones vector normalized based on the light intensity thereof is indicated as $|s_{in}\rangle$. Moreover, it is assumed that the SOP of the input light does not temporally change. Specifically, the following formula is satisfied.

$$\frac{\partial |s_{in}\rangle}{\partial t} = 0$$

By expressing a transposed conjugate vector $|s_{in}\rangle^\dagger$ of the Jones vector $|s_{in}\rangle$ of the input light as $\langle s_{in}|$, $|s_{in}\rangle$ is normalized, so that $\langle s_{in}|s_{in}\rangle = 1$.

The transmission characteristics of a freely-chosen polarization-changing optical fiber whose birefringence temporally changes is expressed by a Jones matrix $T(t)$ set as a function of time. The Jones matrix $T(t)$ is a two-by-two complex matrix, and the components of this matrix are a function of time.

Assuming that a Jones vector of the output light of the optical fiber normalized based on the light intensity is defined as $|s_{out}(t)\rangle$, the relationship between $|s_{in}(t)\rangle$ and $|s_{out}(t)\rangle$ is provided by formula (1) below.

$$|s_{out}(t)\rangle = T(t)|s_{in}\rangle \tag{1}$$

In this case, t denotes time defined at the output end of the optical fiber.

Next, by using one of the simplest models of the time-varying birefringence, its time dependence will be described. As such model, we use a single polarization rotator (i.e., specifically formed by using lithium niobate crystal) and its Jones matrix is expressed as $T_{rot}(t)$. The Jones matrix $T_{rot}(t)$ will be described. If optical axes that provide an extraordinary refractive index and an ordinary refractive index of the polarization rotator respectively match x and y polarizing axes, the Jones matrix $T_{rot}(t)$ that provides the transmission characteristics of the polarization rotator is expressed by formulas (2a) and (2b) below.

$$T_{rot}(t) = e^{-i\phi_c(t)} \begin{bmatrix} e^{-i\phi_b(t)/2} & 0 \\ 0 & e^{+i\phi_b(t)/2} \end{bmatrix} \tag{2a}$$

$$\phi_c(t) = \frac{\omega}{2c}\{n_e(t) + n_o(t)\}L, \phi_b(t) = \frac{\omega}{c}\{n_e(t) - n_o(t)\}L \tag{2b}$$

In formulas (2a) and (2b), c denotes the light velocity, L denotes the device length of the polarization rotator, $n_o(t)$ and $n_e(t)$ respectively denote instantaneous values of an ordinary refractive index and an extraordinary refractive index. Moreover, $\phi_c(t)$ denotes an instantaneous common phase between both polarizing axes definable at the output end of the polarization rotator, and $\phi_b(t)$ denotes an instantaneous birefringence phase (i.e., phase-retardation).

When a control electric field is applied to this polarization rotator, $\phi_b(t)$ temporally changes so that the SOP of the output light also temporally changes. Expressing the SOP as a three-dimensional SOP vector in Stokes space allows for easier understanding of the behavior of the SOP.

In this example, the tip end of the SOP vector corresponding to the Jones vector $|s_{out}(t)\rangle$ of the output light rotates about an $S_1$ axis on the Poincaré sphere as $\phi_b(t)$ changes. Furthermore, the Jones matrix $T_{rot}(t)$ indicated in formula (2a) has the properties of a unitary matrix.

In a case where polarization dependence loss is neglected, the characteristics of an entire long-distance optical fiber are provided by the product of unitary matrices that provide the characteristics of an optical fiber divided into small segments. Even if unitary matrices are multiplied in countless numbers, the unitary matrices can ultimately be expressed with a single unitary matrix. Therefore, the characteristics of a long-distance optical fiber can also be expressed with a single unitary matrix.

A unitary matrix is always expressed by the product of a scalar common phase and a special unitary rotation matrix of a special unitary group SU(2) in which the value of a determinant of this unitary matrix is 1. With regard to a freely-chosen T(t), the common phase thereof is obtained by $(\det T(t))^{1/2} = e^{i\Phi}$, where $\Phi$ denotes the common phase, and a negative value is always obtained due to a delay occurring with propagation through a medium.

Assuming that the rotation matrix belonging to SU(2) divided by the common phase of the Jones matrix T(t) is defined as U(t), formula (1) can be written as formula (3) below.

$$|s_{out}(t)\rangle = e^{i\Phi(t)} U(t) |s_{in}\rangle \quad (3)$$

Partial differentiation is carried out on formula (3) with respect to time, and the relationship indicated by the following formula is used.

$$|s_{in}\rangle = e^{-i\Phi(t)} U^\dagger(t) |s_{out}(t)\rangle$$

Consequently, formula (4) below is obtained.

$$\frac{\partial}{\partial t}|s_{out}(t)\rangle = -i\left[-\left\{\frac{\partial}{\partial t}\Phi(t)\right\} + i\left\{\frac{\partial}{\partial t}U(t)\right\}U^\dagger(t)\right]|s_{out}(t)\rangle \quad (4)$$

The first term in the large parentheses on the right side expresses a change per unit time of a polarization-independent common phase. This first term is in units of rad/s. The second term in the large parentheses relates to a polarization change. Assuming that the second term is defined as a polarization-change operator H(t), H(t) is defined as formula (5) below.

$$H(t) \equiv i\left[\frac{\partial}{\partial t}U(t)\right]U^\dagger(t) \quad (5)$$

This polarization-change operator H(t) is an Hermitian matrix in which the trace is zero, and has two eigenvalues the sum of which always becomes zero. The eigenvectors belonging to these eigenvalues are orthogonal to each other.

Next, the polarization-change operator H(t) is expressed as a vector in Stokes space. A two-by-two Hermitian matrix in which the trace is zero can be expanded with three Pauli matrices that are bases independently orthogonal to one another, and the expansion coefficients thereof are always real numbers.

The three Pauli matrices $\sigma_1$, $\sigma_2$, and $\sigma_3$ are provided by formula (6) below.

$$\sigma_1 = \begin{bmatrix} 1 & 0 \\ 1 & -1 \end{bmatrix}, \sigma_2 = \begin{bmatrix} 0 & 1 \\ 1 & 0 \end{bmatrix}, \sigma_3 = \begin{bmatrix} 0 & -i \\ i & 0 \end{bmatrix}, \quad (6)$$

The expansion coefficients of $\sigma_1$, $\sigma_2$, and $\sigma_3$, are $S_1$, $S_2$, and $S_3$ components of a Stokes vector.

By using the three Pauli matrices $\sigma_1$, $\sigma_2$, and $\sigma_3$, the polarization-change operator H(t) is expanded such as to be provided by formula (7) below.

$$H(t) = \frac{1}{2}\sum_{m=1}^{3} v_m(t)\sigma_m = \frac{1}{2}\begin{bmatrix} v_1(t) & v_2(t) - iv_3(t) \\ v_2(t) + iv_3(t) & -v_1(t) \end{bmatrix} \quad (7)$$

Expansion coefficients $v_1(t)$, $v_2(t)$, and $v_3(t)$ (PV vector components) are provided by formula (8) below.

$$\omega_{bm}Tr\{\sigma_m H9t)\}$$

By defining a spin vector $\sigma$ as $\sigma = [\sigma_1, \sigma_2, \sigma_3]$ and a vector v as $v(t) = [v_1(t), v_2(t), v_3(t)]^T$, H(t) can be expressed by formula (9) below.

$$H(t) = 1/2 v(t) \cdot \sigma \quad (9)$$

The vector v(t) expresses H(t), which expresses a polarization change, as a three-dimensional real vector in the Stokes space. In this case, the vector v(t) will be defined as a PV vector.

Next, the physical properties of the PV vector v(t) in the Stokes space will be described. The magnitude of the PV vector v(t) is determined from the two characteristic values of the Hermitian matrix H(t). The two real eigenvalues of the Hermitian matrix H(t) will be defined as $A_\pm(t)$. The product of eigenvalues of a square matrix is equal to the value of a determinant of that matrix, and the sum of the eigenvalues is equal to the trace of that matrix. By utilizing these properties, the relationship provided by formulas (10a) and (10b) below can be obtained.

$$\Lambda_+(t)\Lambda_-(t) = \det H(t) = -1/4(v_1^2(t) + v_2^2(t) + v_3^2(t)) \quad (10a)$$

$$\Lambda_+(t)\Lambda_-(t) = TrH(t) = 0 \quad (10b)$$

Based on this relationship, the two eigenvalues $A_\pm(t)$ are provided by formula (11) below.

$$\Lambda_\pm(t) = \pm 1/2\sqrt{v_1^2(t) + v_2^2(t) + v_3^2(t)} \quad (11)$$

Accordingly, it becomes clear that the difference between the eigenvalues of H(t) provided by formula (12) below is equal to the magnitude of the PV vector v(t) in the Stokes space.

$$\Lambda_+(t) - \Lambda_-(t) = \sqrt{v_1^2(t) + v_2^2(t) + v_3^2(t)} \quad (12)$$

By determining the two eigenvalues $A_\pm(t)$ from the Jones matrix $T_{rot}(t)$ of the polarization rotator provided by formulas (2a) and (2b), formula (13) below is obtained.

$$\Lambda_\pm(t) = \pm\frac{1}{2}\frac{\partial}{\partial t}\phi_b(t) \quad (13)$$

In this case, it is clear that the magnitude of the PV vector v(t) is provided by the following formula and that a change in birefringence phase $\phi_b(t)$ per unit time at the output end of the polarization rotator, namely, first-order time differentiation (in units of rad/s) of the phase difference between the polarizing axes, can be expressed.

$$\Lambda_+(t) - \Lambda_-(t) = \partial\phi_b(t)/\partial t$$

Furthermore, the direction of the PV vector v(t) can be determined based on eigenvectors belonging to the eigenvalues $A_\pm(t)$ with respect to H(t). Eigenvectors $|p_\pm(t)\rangle$ belonging to these two characteristic values are determined from formula (14) below.

$$|p_{\pm}(t)\rangle = k \begin{bmatrix} v_2(t) - iv_3(t) \\ -v_1(t) + 2\Lambda_{\pm}(t) \end{bmatrix} \quad (14)$$

In this case, k denotes a freely-chosen constant, which is not zero. These two characteristic vectors express the Jones vectors of the polarization rotator. Freely-chosen Jones vector |s> can be transformed into a three-dimensional real vector in the Stokes space by calculating <s|σ|s>.

The two eigenvectors are transformed into real vectors in the Stokes space in accordance with formula (15) below.

$$\langle p_{\pm}|\vec{\sigma}|p_{\pm}\rangle = \left(2k^2\sqrt{v_1^2+v_2^2+v_3^2} \mp v_1\right) \begin{bmatrix} \pm v_1 \\ \pm v_2 \\ \pm v_3 \end{bmatrix} \quad (15)$$

Because the scalar section on the right side of formula (15) is always positive, it is clear that +v(t) is a vector indicating $|p_+\rangle$ in the Stokes space. $|p_+\rangle$ is an eigenvector belonging to the characteristic value $\Lambda_+(t)$ and belongs to the eigenvalue $\Lambda_+(t)$ determined from the Jones matrix $T_{rot}(t)$ of the polarization rotator. Therefore, it is clear that the direction of the vector v(t) indicates a fast axis in the Stokes space.

The properties of a PV vector will now be summarized. The polarization-change operator H(t) is an Hermitian matrix in which the trace is zero, and has two eigenvalues provided by formula (13). Furthermore, two orthogonal eigenvectors belonging to these eigenvalues exist. The two eigenvalues respectively indicate rates of phase change in orthogonal polarizing axes. Consequently, there are always orthogonal output states of polarization at every instant, and the difference between the eigenvalues causes a phase difference between the orthogonal polarizing axes, namely, a substantial polarization change, to occur. A PV vector expresses these eigenvalues and eigenvectors within the Stokes space. The magnitude of the PV vector in the Stokes space expresses the rate of change (in units of rad/s) of the phase difference occurring between the orthogonal polarizing axes, and the direction of the PV vector is the direction of the fast axis of the optical fiber. Specifically, since a PV vector is expressed as the rate of change in the phase difference occurring between the orthogonal polarizing axes of the optical fiber, the PV vector indicates the primary properties of the optical fiber that is not dependent on an input.

Relationship Between PV Vector and SOP Vector

Next, the relationship between a PV vector and an output SOP vector is determined By using this relationship, a PV vector of a measurement object is measured using the PV vector measuring apparatus 100 illustrated in FIG. 1.

A Jones vector of output light output from the measurement object 103 illustrated in FIG. 1 is transformed into an SOP vector in Stokes space in accordance with formula (16) below.

$$s_{out}(t) = \langle s_{out}(t)|\sigma|s_{out}(t)\rangle \quad (16)$$

By carrying out partial differentiation on formula (16) with respect to time, formula (17) below is obtained.

$$\frac{\partial}{\partial t}s_{out}(t) = \left\{\frac{\partial}{\partial t}\langle s_{out}(t)|\}\sigma\middle|s_{out}(t)\rangle + \langle s_{out}(t)\middle|\sigma\left\{\frac{\partial}{\partial t}\middle|s_{out}(t)\rangle\right\}\right\} \quad (17)$$

It was known that the spin matrices and the arbitrary 3-by-1 vector satisfied following relation:

$$(a\cdot\sigma)\sigma = aI - ia\times\sigma, \quad \sigma(a\cdot\sigma) = aI + ia\times\sigma, \quad \langle s|(a\times\sigma)|s\rangle = a\times s$$

By utilizing the formula (4), formula (9), $|s_{in}\rangle^{\dagger} = \langle s_{in}|$, H(t) being an Hermitian matrix, and above fact for the spin matrices, formula (17) becomes formula (18) below. In this case, I denotes a unit vector.

$$\frac{\partial}{\partial t}s_{out}(t) = v(t) \times s_{out}(t) \quad (18)$$

Formula (18) is a relational formula that associates an SOP vector output from an optical element (in this case, the measurement object) in the Stokes space with the polarization change characteristics of the optical fiber itself, namely, the PV vector. Although an output SOP of a long-distance optical fiber changes randomly, an instantaneous locus of the tip end of the SOP vector has clear rotation centered on the PV vector even with respect to a random change. Because the PV vector gives the rotation of the output SOP vector in Stokes space, it is obviously that the magnitude of the PV vector corresponds to the angular velocity (rad/s) of the rotation itself. So, the magnitude of the PV vector means the possible maximum variation rate of the SOP change for any input SOP of the probe light.

By executing the first and second steps described above in the PV vector measuring apparatus 100 illustrated in FIG. 1, SOP vectors $s_i(t)$ and $s_j(t)$ output from the measurement object 103 are obtained. In this case, by obtaining the outer products of formulas $\partial s_i(t)/\partial t = v(t) \times s_i(t)$ and $\partial s_j/\partial t = v(t) \times s_j(t)$ by utilizing the fact that these formulas are satisfied for the PV vector v(t) with respect to the measurement object 103 from formula (18), the PV vector v(t) is provided by formula (A) below by using the vector quadruple product rule.

$$v(t) = \frac{\frac{\partial \vec{s}_i(t)}{\partial t} \times \frac{\partial \vec{s}_j(t)}{\partial t}}{\frac{\partial \vec{s}_i(t)}{\partial t} \cdot \vec{s}_j(t)} \quad (A)$$

However, in the case where a PV vector v is to be determined by using formula (A), as described above, if the direction of the PV vector v matches the direction of the SOP vector $s_i(t)$ that provides the SOP of the output light, $\partial s_i(t)/\partial t$ becomes zero, and a singular point at which the denominator of formula (A) becomes zero is thus included.

In order to determine a PV vector v without including such a singular point, a method for determining an outer-product operator of the PV vector v by using a Mueller matrix R(t) to be described below is used. A PV vector measurement principle according to this method will be described in detail below.

PV Vector Measurement Principle

First Measurement Principle

In order to determine the magnitude of a PV vector of the measurement object 103 (i.e., a change in phase difference occurring between the orthogonal polarizing axes at every instant) based on a first measurement principle, the four steps described above (i.e., the first to fourth steps) are executed.

In correspondence with the polarizing directions of light to be input to the measurement object 103, an SOP vector of output light from the measurement object 103 corresponding to one of the polarizing directions will be defined as $t_1$, and an SOP vector of output light corresponding to the other polarizing direction will be defined as $t_a$.

The SOP vectors $t_1$ and $t_a$ of the output light express the two states of polarization split from each other at a time interval for switching between the orthogonal states of polarization of the measurement probe light after the output light (i.e., measurement probe light) from the polarization switch 102 is input to the measurement object 103 and the output SOP vector thereof is measured by the polarimeter 104. Since switching between the orthogonal states of polarization of the probe light is performed in a short period of time, the SOP vectors, which have been split from each other at this switching time interval, of the output light from the measurement object 103 can be regarded as output SOP vectors measured at substantially the same time with respect to inputs of two different states.

It is assumed that the SOP vectors $t_1$ and $t_a$ of the output light are respectively expressed as $t_1 = (t_{11}, t_{12}, t_{13})^T$ and $t_a = (t_{a1}, t_{a2}, t_{a3})^T$. Then, two new vectors $t_2$ and $t_3$ are respectively defined as $t_3 = t_1 \times t_a = (t_{31}, t_{32}, t_{33})^T$ and $t_2 = t_3 \times t_1 = (t_{21}, t_{22}, t_{23})^T$.

By using the vector $t_1$, the vector $t_2$, and the vector $t_3$, an instantaneous Mueller matrix R(t) of the optical fiber can be expressed as formulas (19a) and (19b) below (see R. M. Jopson, L. E. Nelson, and H. Kogelnik, "Measurement of Second Order Polarization-Mode Dispersion Vectors in Optical Fibers," IEEE Photonics Technology Letters, vol. 11, No. 9, (1999), pp 1153-1155 (which will be referred to as "Non Patent Literature 3" hereinafter)). Although a Mueller matrix is normally a four-by-four matrix, the Mueller matrix in this case has the first row component and the first column component removed therefrom so as to be treated as a three-by-three matrix.

$$R^\dagger = \begin{bmatrix} t_{11} & t_{12} & t_{13} \\ t_{21} & t_{22} & t_{23} \\ t_{31} & t_{32} & t_{33} \end{bmatrix} \quad (19a)$$

$$R = \begin{bmatrix} t_{11} & t_{21} & t_{31} \\ t_{12} & t_{22} & t_{32} \\ t_{13} & t_{23} & t_{33} \end{bmatrix} \quad (19b)$$

With regard to the Mueller matrix R(t) provided by formulas (19a) and (19b), assuming that an SOP vector, in the Stokes space, of the output light of the optical fiber normalized based on the light intensity thereof is defined as $\vec{s}_{out}(t)$, the relationship between $\vec{s}_{in}(t)$ and $\vec{s}_{out}(t)$ is provided by formula (20) below.

$$\vec{s}_{out}(t) = R(t)\vec{s}_{in} \quad (20)$$

By carrying out first-order partial differentiation on formula (20) with respect to time, formula (21) below is obtained.

$$\frac{\partial}{\partial t}\vec{s}_{out}(t) = \frac{\partial}{\partial t}R(t)\vec{s}_{in} \quad (21)$$

Since $\vec{s}_{in} = R^\dagger(t)\vec{s}_{out}(t)$ from formula (20), formula (22) below is obtained by substituting $\vec{s}_{in} = R^\dagger(t)\vec{s}_{out}(t)$ into formula (21).

$$\frac{\partial}{\partial t}\vec{s}_{out}(t) = \left\{\frac{\partial}{\partial t}R(t)\right\}R^\dagger(t)\vec{s}_{in}(t) \quad (22)$$

Moreover, as described above, the PV vector v and the SOP vector $\vec{s}_{out}(t)$ of the output light in the Stokes space have the relationship provided by formula (18).

$$\frac{\partial}{\partial t}\vec{s}_{out}(t) = \vec{v} \times \vec{s}_{out}(t) \quad (18)$$

By comparing formula (22) with formula (18), the outer-product operator "v×" of the PV vector v is written as formula (23) below.

$$\vec{v}\times = \left\{\frac{\partial}{\partial t}R(t)\right\}R^\dagger(t) \quad (23)$$

This arithmetic formula can be expressed by a matrix, as in formula (24) below.

$$\vec{v}\times = \begin{bmatrix} 0 & -v_3 & v_2 \\ v_3 & 0 & -v_1 \\ -v_2 & v_1 & 0 \end{bmatrix} \quad (24)$$

In this case, $v_1$, $v_2$, and $v_3$ are components of the PV vector v. Specifically, by determining a Mueller matrix R(t), an instantaneous characteristic vector v(t) related to a first-order temporal change in the measurement object 103 (such as an optical fiber) can be determined The magnitude of this vector is a value unique to the measurement object 103 (such as an optical fiber). This value implies a first-order rate of temporal change (rad/s) in a phase difference occurring between the fast axis and the slow axis. This measurement process is similar to the measurement of polarization mode dispersion (PMD) vector. PMD vector is defined by the dependence of the angular frequency of the target static birefringence whereas the PV vector can be defined by the time dependence of the one. With regard to the measurement object 103, which is static, a method of measuring a polarization mode dispersion (PMD) vector by measuring the angular-frequency dependency of the output state of polarization for each of the two different input states of polarization is applied to a change within a time domain, so that instantaneous birefringence of the measurement object 103 can be measured.

The method of measuring a PMD vector based on first-order differentiation of the optical angular frequency by using a Mueller matrix R(t) is disclosed in Non Patent Literature 3 described above.

With the method of calculating a PV-vector outer-product operator "v×" provided by formula (23) from the Mueller matrix R(t) of the measurement object 103 and determining a PV vector $v(t) = |v_1(t), v_2(t), v_3(t)|^T$ from the matrix components that provide this PV-vector outer-product operator, a PV vector can be measured even when the direction of the PV vector v matches the direction of the SOP vector $s_i(t)$, which provides the SOP of the output light, and $\partial s_i(t)/\partial t$ becomes zero due to $s_i(t)$ of the output light not temporally changing relative to a change in birefringence. In other words, a PV vector can be measured without including a singular point.

Second Measurement Principle

In addition to the first measurement principle described above, there is a method of determining a PV vector $v(t)=|v_1(t), v_2(t), v_3(t)|^T$ by calculating a polarization-change operator H(t) using a rotation matrix U(t) of SU(2) divided by the common phase of a Jones matrix. This method involves determining a PV vector v ($v_1$, $v_2$, $v_3$) by using formula (8) described above based on a polarization-change operator H(t) expressing a polarization change in a measurement object and provided by formulas (5) and (7) described above by using a rotation matrix U(t).

Generally, a Jones matrix is determined by setting three known states of polarization for measurement probe light and measuring the states of polarization of output light from a measurement object corresponding to the three states of polarization.

Specifically, a PV vector v can be obtained from formula (8) by setting the polarization switch 102 to periodically output light sequentially in three states of polarization in 0°, 90°, and 45° directions relative to the x and y polarizing axes and then determining a Jones matrix by observing the SOP of output light output from a measurement object for each of the three states of polarization.

In this case, in order to determine a PV vector (i.e., a change in phase difference occurring between orthogonal polarizing axes at every instant) of the measurement object 103 by using the PV vector measuring apparatus 100 illustrated in FIG. 1, the following four steps (i.e., first to fourth steps) may be performed.

First Step

Probe light is input to the polarization switch 102 and is output therefrom after the state of polarization of the probe light input to the polarization switch 102 is alternately switched among three states of polarization in which the polarizing axes differ from one another by 45°. The probe light is then input to the measurement object 103.

Second Step

The time dependency of an SOP vector of the output light output from the measurement object 103 is observed in an oscilloscope mode by using the polarimeter 104 and is stored into the PV vector calculating device 105.

Third Step

The SOP vector stored in the PV vector calculating device 105 is split into SOP vectors that correspond with the three states of polarization of the measurement probe light so that the time dependency of the SOP vector is determined. Based on this time dependency of the SOP vector, a rotation matrix U(t) belonging to SU(2) divided by the common phase of a Jones matrix of the measurement object 103 is determined.

Fourth Step

A PV vector $v(t)=|v_1(t), v_2(t), v_3(t)|^T$ is determined in accordance with formula (8) from the rotation matrix U(t) of the measurement object 103.

As described above, a Jones matrix is determined by measuring the SOP of output light from the measurement object corresponding to each of the three states of polarization of the measurement probe light. Specifically, a Jones matrix is determined as follows.

Assuming that two-by-one Jones vectors respectively measured for measurement probe input light beams polarized in the x-axis direction, the y-axis direction, and a direction tilted at 45° from the x axis are defined as a vector $\zeta(\Lambda_x, \zeta_y)$, a vector $\eta(\eta_x, \eta_y)$, and a vector $\zeta(\zeta_x, \zeta_y)$, a Jones matrix T(t) is provided by formula (25) below.

$$T(t) = \begin{bmatrix} k_1 k_4 & k_2 \\ k_4 & 1 \end{bmatrix} \quad (25)$$

In this case, $k_1 = \zeta_x/\zeta_y$, $k_2 = \eta_x/\eta_y$, $k_3 =_y$, and $k_4 = (k_3 - k_2)/(k_1 - k_3)$. By using the measurement probe light beams in the three different states of polarization, the output light from the measurement object can be split into three states, so that a Jones matrix at each instant is obtained.

The common phase of this Jones matrix T(t) is $(\det(T))^{1/2}$, and a unitary matrix U(t) of SU(2) corresponding to the Jones matrix T(t) is determined to be $U(t)=T(t)/\{(\det(T))^{1/2}\}$. By using this unitary matrix U(t), formula (26) below is obtained. A PV vector v ($v_1$, $v_2$, $v_3$) can be determined from matrix components provided by formula (26). Formula (26) corresponds to formulas (5), (7), and (8) described above.

$$i\left\{\frac{\partial}{\partial t}U(t)\right\}U^\dagger(t) = \frac{1}{2}\begin{bmatrix} v_1 & v_2 - iv_3 \\ v_2 + iv_3 & -v_1 \end{bmatrix} \quad (26)$$

By determining a PV vector v in accordance with the method based on this second measurement principle, the polarization change characteristics of a measurement object itself not including a singular point and also not dependent on the state of polarization of measurement probe light can be determined Demonstration Test The advantages achieved by a PV vector measuring method realized by a PV vector measuring apparatus according to an embodiment of the present invention are confirmed by using a pseudo measurement object (pseudo-DUT) in which dynamic polarization rotation is controllable. Specifically, the advantages are confirmed by specifically fabricating a PV vector measuring apparatus and then comparing a calculation result of a PV vector with respect to the pseudo-DUT with a PV vector observed by the PV vector measuring apparatus. A demonstration test performed based on the first measurement principle will be described below.

The contents and results of a test for demonstrating the PV vector measurement principle described above will be described with reference to FIG. 3. A PV vector measuring apparatus illustrated in FIG. 3 has a distributed feedback (DFB) laser 111 serving as a light source that outputs probe light, a polarization switch 112, a polarimeter 114 with a sampling rate of 48 kS/s, and a commercially-available PC 115 having installed therein software for calculating a PV vector v(t).

The polarization switch 112 alternately switches the state of polarization of measurement probe light between two states of polarization in accordance with a rectangular wave modulation signal output from a rectangular wave generator 116. A polarization rotator that imparts a birefringence change in accordance with an electro-optic effect is preferably used as the polarization switch 112. For example, a polarization rotator that uses lithium niobate can be used.

The wavelength of the DFB laser 111 is 1550.5 nm For the polarimeter 114, POD-101D manufactured by General Photonics Corporation is used.

As the pseudo-DUT, a pseudo-DUT 113 is used, which is obtained by connecting three polarization rotators ($R_1$, $R_2$, and $R_3$) in which the polarization rotating operation is controllable. These polarization rotators are simultaneously drivable. The polarization rotation axes of the respective polarization rotators $R_i$, $R_2$, and $R_3$ constituting the pseudo-DUT 113 are $S_2$, $S_1$, and $S_3$ axes in this order for the polarization rotators $R_1$, $R_2$, and $R_3$ in Stokes space. The three polarization rotators $R_1$ to $R_3$ constituting this pseudo-DUT 113 are each composed of a bulk-type lead-magnesium-niobate lead-titanate (PMN-PT).

PMN-PT can cause a phase difference to occur between orthogonal polarizing axes in accordance with an electro-optic Kerr effect. PMN-PT is characterized in being isotropic with respect to a refractive index and not inducing birefringence unless control voltage is applied thereto. A rotation matrix that provides polarization characteristics of PMN-PT with control voltage applied thereto can be treated as a unit matrix. Furthermore, the magnitude of birefringence occurring in PMN-PT is proportional to the square of applied voltage due to being based on an electro-optic Kerr effect.

A control signal whose voltage changes in a sinusoidal pattern in a range between zero and Vn is applied to each of the polarization rotators $R_1$ to $R_3$. This control signal is generated by amplifying a 200-Hz sine wave generated from a function generator 120 by using a high voltage driver 122. The voltage Vn causes a birefringence phase change of it radian to occur in each of the polarization rotators $R_1$ to $R_3$.

Therefore, since the birefringence phase changes in a range between zero and it radian in accordance with this control signal in each of the polarization rotators $R_1$ to $R_3$, the locus of the tip end of an SOP vector of output light output from the pseudo-DUT 113 reciprocates semi-circularly on a Poincaré sphere at a period of 200 Hz.

As illustrated in FIG. 3, the output light output from the pseudo-DUT 113 is input to the polarimeter 114 via a single mode fiber (SMF). Although this SMF does not necessarily have to be provided in this demonstration test, the polarimeter (model number: POD-101A) manufactured by General Photonics Corporation used here has a single mode fiber attached thereto so that it can readily receive the output light output from the pseudo-DUT 113. In the following description of this demonstration test, the effect of polarization transformation occurring in this single mode fiber is compensated for so as to be negligible.

The polarimeter 114 used here is capable of performing measurement in an oscilloscope mode and is a model convenient for observing an SOP vector. The sampling rate of this polarimeter 114 is 48 kS/s.

Contents and Results of Demonstration Test

The demonstration test is performed based on the following procedure by using the PV vector measuring apparatus illustrated in FIG. 3.

As described above, the measurement process is performed by simultaneously controlling the polarization rotators $R_1$ to $R_3$ in accordance with the control signals generated by amplifying a 200-Hz sine wave, generated from the function generator 120, by using the high voltage driver 122. Each control signal changes in a sinusoidal pattern in the range between zero and V$\pi$, and V$\pi$ is a voltage that causes a birefringence phase change of it radian to occur in PMN-PT. Therefore, the locus of the tip end of an SOP vector of output light output from the pseudo-DUT 113 reciprocates semi-circularly on a Poincaré sphere at a period of 200 Hz.

Figure 4A:
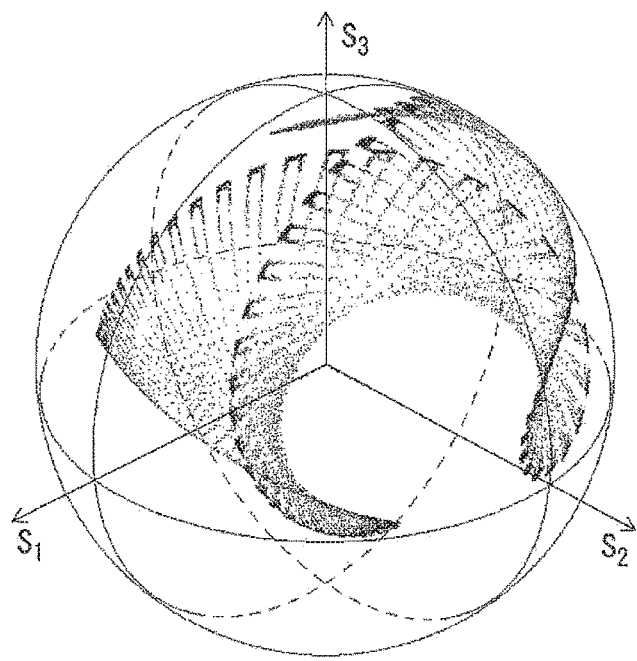
FIGS. 4A and 4B are diagrams illustrating a locus formed on a Poincaré sphere by a tip end of an SOP vector of output light output from a pseudo measurement object.
Figure 4B:
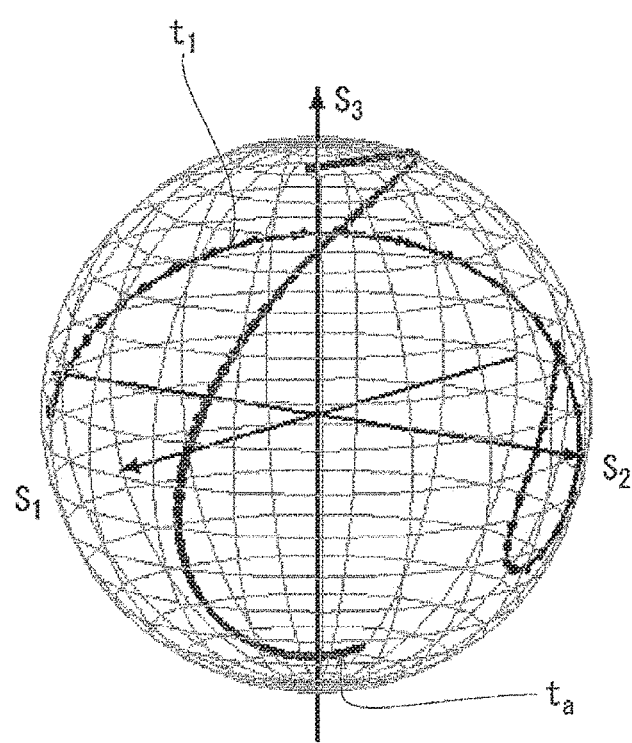

FIG. 4A illustrates an example of the locus formed on the Poincaré sphere by the tip end of the SOP vector of the output light output from the pseudo-DUT 113. FIG. 4B illustrates a state where the SOP vector of the output light output from the measurement object 103 is split in correspondence with two orthogonal states of polarization of measurement probe light. In FIG. 4B, the SOP vector of the output light output from the measurement object 103 is split in correspondence with two orthogonal states of polarization $t_1$ and $t_a$ of the measurement probe light. FIG. 4B is similar to FIG. 2B described above in that the opposite sides of a lightly shaded belt on the Poincaré sphere in FIG. 4A are extracted in the form of lines. The loci of the tip ends of the SOP vectors, which correspond to the two orthogonal states of polarization $t_1$ and $t_a$ of the measurement probe light, of the output light output from the measurement object 103 are indicated as $t_1$ and $t_a$, respectively.

Figure 5:
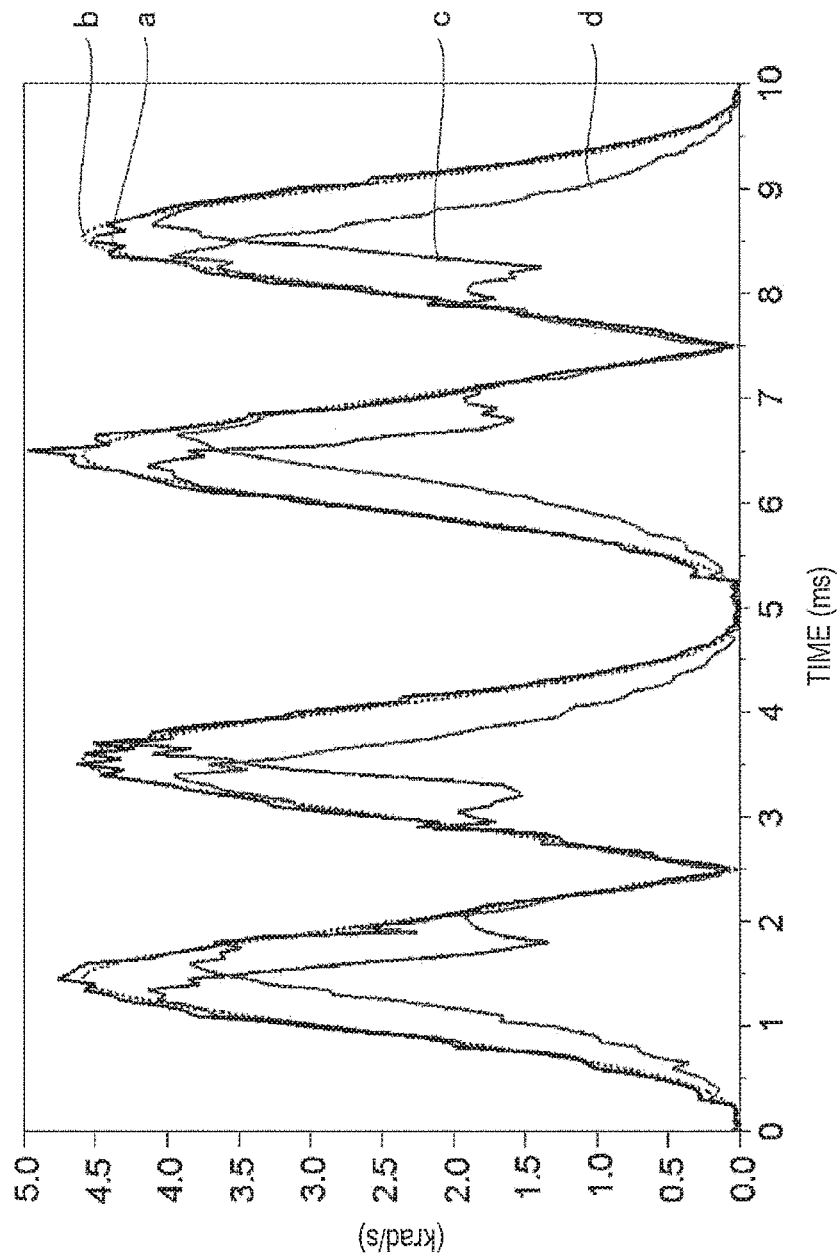
FIG. 5 is a diagram illustrating a comparison between an actually measured value and a calculated value of a temporal change in the magnitude of a PV vector v obtained in accordance with a PV vector measuring method according to an embodiment of the present invention and a measurement result obtained in accordance with a measuring method in the related art.

Results obtained by comparing an actually measured value and a calculated value of a temporal change in the magnitude of a PV vector v obtained by the PV vector measuring method according to the embodiment of the present invention with a measurement result of the rate of temporal change $\partial\alpha/\partial t$(rad/s) in angle $\alpha = \cos^{-1}[s_{out}(t) \cdot s_{out}(t+\Delta t)]$ formed by two SOP vectors $s_{out}(t)$ and $s_{out}(t+\Delta t)$ disclosed in Non Patent Literature 1 will now be described with reference to FIG. 5. The value of the rate of temporal change $\partial\alpha/\partial t$ (rad/s) is determined from the SOP vectors, which correspond to the two orthogonal states of polarization $t_1$ and $t_a$ of the measurement probe light, of the output light output from the measurement object 103.

In FIG. 5, the abscissa axis indicates time in units of milliseconds (ms), and the ordinate axis indicates the magnitude of the PV vector v and also indicates the value of $\partial\alpha/\partial t$ in units of kiloradians per second (krad/s). In FIG. 5, a curve line a indicates the magnitude of the PV vector v obtained by the PV vector measuring method according to the embodiment of the present invention, a dashed curve line b indicates the calculated value, a curve line c indicates the value of $\partial\alpha/\partial t$ determined from the SOP vector $t_1$, and a curve line d indicates the value of $\partial a/\partial t$ determined from the SOP vector $t_a$.

The curve line c and the curve line d are different curve lines and are also different from the curve line a and the curve line b. This is the result of the value of $\partial\alpha/\partial t$ being dependent on the SOP of input light to be input to the pseudo-DUT 113. On the other hand, the curve line a and the curve line b substantially overlap each other and indicate that the actually measured value of the magnitude of the PV vector v obtained by the PV vector measuring method according to the embodiment of the present invention substantially matches the calculated value. In other words, the PV vector measuring method according to the embodiment of the present invention is an excellent method by which a measurement object can be measured without being dependent on the state of polarization of probe light.

Results obtained by comparing an actually measured value and a calculated value of a temporal change in the magnitude of a PV vector v obtained by the PV vector measuring method according to the embodiment of the present invention with a measurement result obtained in accordance with a $\partial r/\partial t$ measuring method will now be described with reference to FIG. 6. $\partial r/\partial t$ denotes the rate of change in latitude-longitude information determined based on an amount of change $\sigma$ on the equator and an amount of change $\theta$ on the diameter in the coordinate system (1, $\sigma$, $\theta$) of the Poincaré sphere with the radius of 1 disclosed in Non Patent Literature 2 described above. The value of $\partial r/\partial t$ (rad/s) is determined from the SOP vectors, which correspond to the two orthogonal states of polarization $t_1$ and $t_a$ of the measurement probe light, of the output light output from the measurement object 103.

Figure 6:
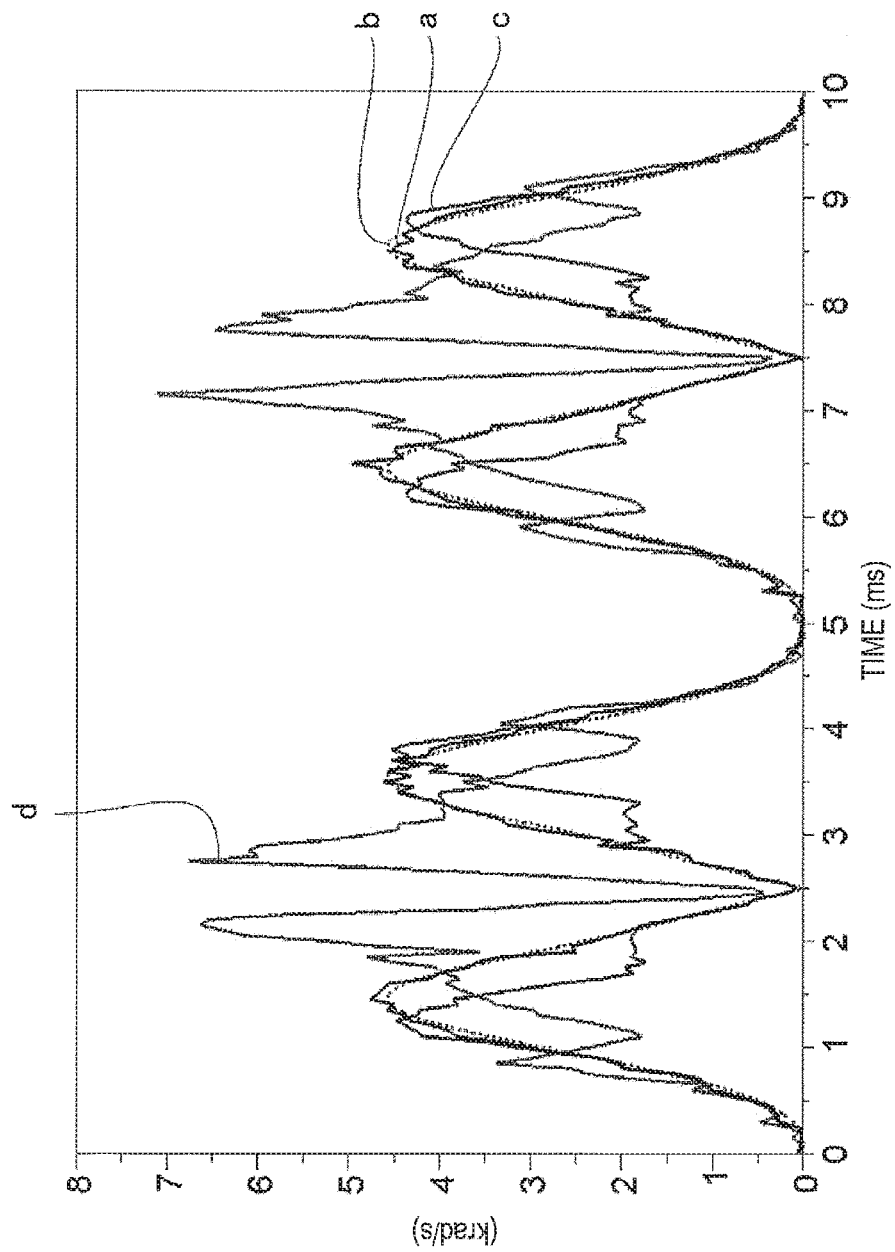
FIG. 6 is a diagram illustrating a comparison between an actually measured value and a calculated value of a temporal change in the magnitude of a PV vector v obtained by the PV vector measuring method according to the embodiment of the present invention and a measurement result obtained in accordance with a method disclosed in a related-art document.

In FIG. 6, the abscissa axis indicates time in units of milliseconds (ms), and the ordinate axis indicates the magnitude of the PV vector v and also indicates the value of $\partial r/\partial t$ in units of kiloradians per second (krad/s). In FIG. 6, a curve line a indicates the magnitude of the PV vector v obtained by the PV vector measuring method according to the embodiment of the present invention, a dashed curve line b indicates the calculated value, a curve line c indicates the value of ∂r/∂t determined from the SOP vector $t_1$, and a curve line d indicates the value of ∂r/∂t determined from the SOP vector $t_a$.

The curve line c and the curve line d are different curve lines and are also different from the curve line a and the curve line b. This is the result of value of ∂r/∂t being dependent on the SOP of input light to be input to the pseudo-DUT 113. On the other hand, the curve line a and the curve line b substantially overlap each other and indicate that the actually measured value of the magnitude of the PV vector v obtained by the PV vector measuring method according to the embodiment of the present invention substantially matches the calculated value. In other words, the PV vector measuring method according to the embodiment of the present invention is an excellent method by which a measurement object can be measured without being dependent on the state of polarization of probe light.

Figure 7:
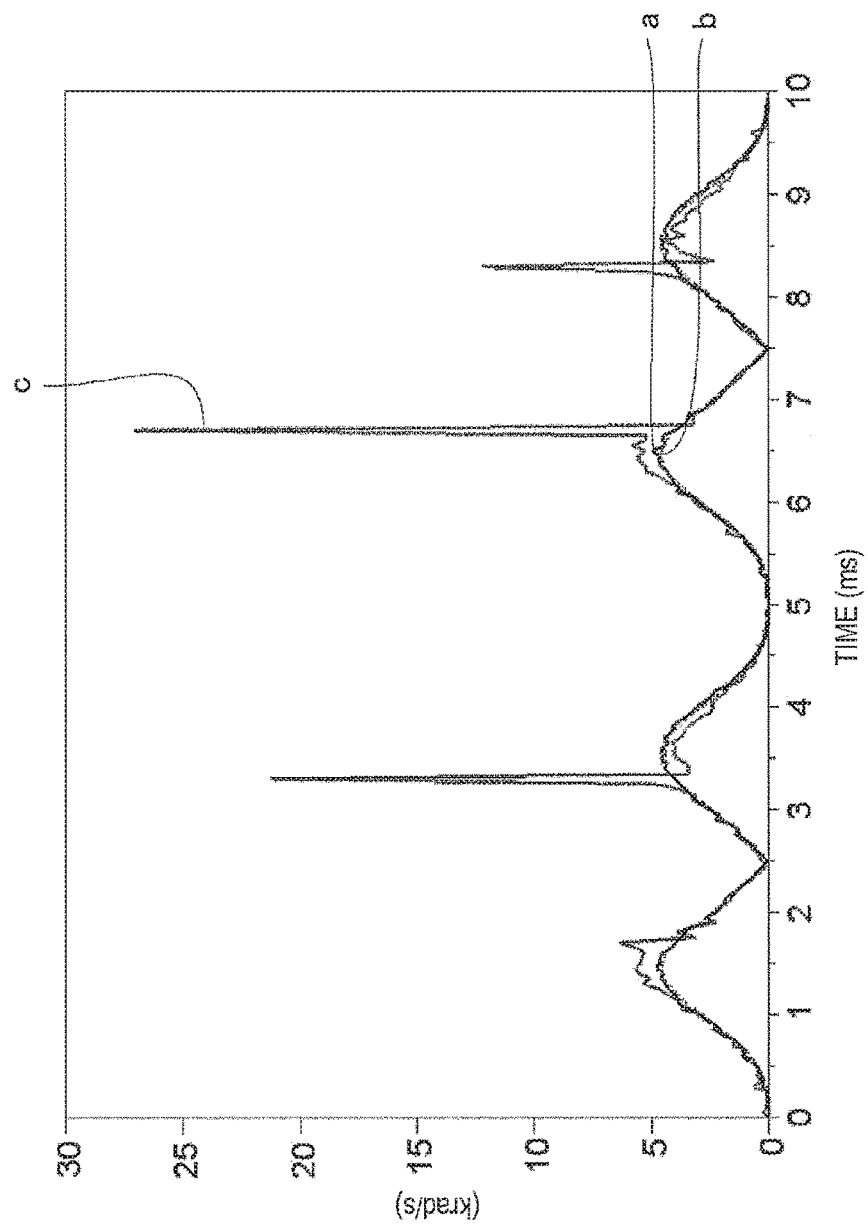
FIG. 7 is a diagram illustrating a comparison between an actually measured value and a calculated value of a temporal change in the magnitude of a PV vector v obtained by the PV vector measuring method according to the embodiment of the present invention and a measurement result of the magnitude of a PV vector v obtained by using formula (A)

Results obtained by comparing an actually measured value and a calculated value of a temporal change in the magnitude of a PV vector v obtained by the PV vector measuring method according to the embodiment of the present invention with a measurement result obtained by actually measuring SOP vectors $s_i$ and $s_j$, which provide the states of polarization of output light from the measurement object, and determining the magnitude of the PV vector v by using formula (A) above will now be described with reference to FIG. 7. For determining the PV vector v by using formula (A), $s_i=t_1$ and $s_j=t_a$ are set.

In FIG. 7, the abscissa axis indicates time in units of milliseconds (ms), and the ordinate axis indicates the magnitude of the PV vector v and also indicates the value of ∂r/∂t in units of kiloradians per second (krad/s). In FIG. 7, a curve line a indicates the magnitude of the PV vector v obtained by the PV vector measuring method according to the embodiment of the present invention, a dashed curve line b indicates the calculated value, and a curve line c indicates the measurement result of the magnitude of the PV vector v determined by using formula (A).

The curve line a and the curve line b substantially overlap each other and indicate that the actually measured value of the magnitude of the PV vector v obtained by the PV vector measuring method according to the embodiment of the present invention substantially matches the calculated value. On the other hand, the curve line c has spike-shaped singular values at several locations. This indicates that the denominator of formula (A) that provides a PV vector is close to zero in the vicinity of each spike-shaped singular value. Specifically, this indicates that the direction of an SOP vector $s_i(t)$ of a light wave output from the measurement object is substantially the same as the direction of a PV vector v at a location (i.e., time) that indicates a spike-shaped singular value, and also indicates that the SOP vector $s_i(t)$ hardly temporally changes and ∂$s_i(t)$/∂t at the denominator of formula (A) is a value close to zero.

In contrast, the PV vector v indicated by the curve line a and obtained by the PV vector measuring method according to the embodiment of the present invention does not have locations that indicate spike-shaped singular values. Specifically, in addition to being an excellent method by which a measurement object can be measured without being dependent on the state of polarization of probe light, the PV vector measuring method according to the embodiment of the present invention can measure a PV vector without including a singular point.

Application Example of PV Vector Measurement

An application example of the PV vector measuring apparatus described with reference to FIG. 1 will now be described with reference to FIG. 8. The application example in this case relates to a system that monitors situations such as illegal trespassing of an intruder over a fence.

In this system, an optical fiber sensor is attached to a fence to be monitored, and this optical fiber sensor is set as a measurement object to be measured by the PV vector measuring apparatus according to the embodiment of the present invention.

Specifically, this system measures a PV vector of this optical fiber sensor so as to detect whether there is any kind of abnormality in, for example, the fence to which this optical fiber sensor is attached.

Figure 8:
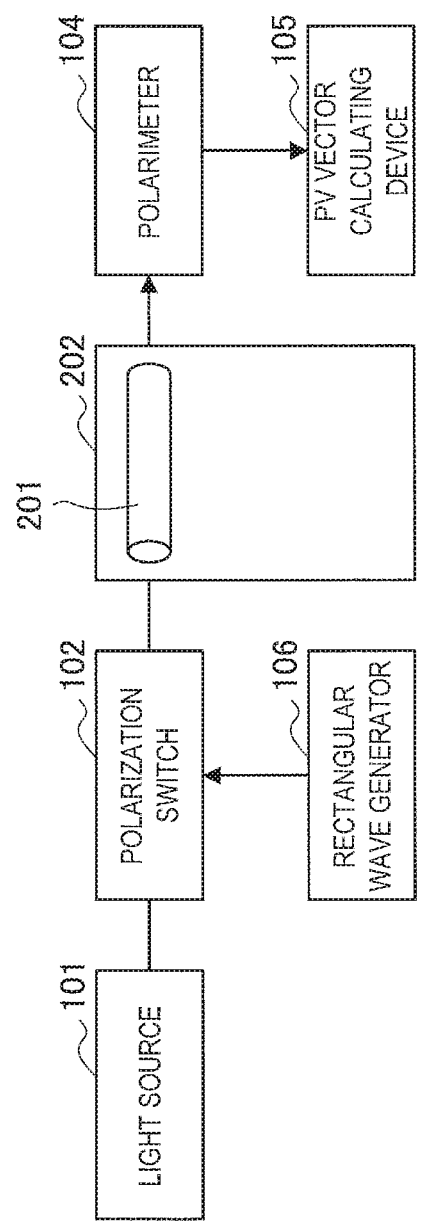
FIG. 8 is a diagram for explaining an application example of the PV vector measuring apparatus according to the embodiment of the present invention.

As illustrated in FIG. 8, an optical fiber sensor 201 is attached to a fence 202 to be monitored. If the fence 202 deforms as a result of a certain situation, the optical fiber sensor 201 attached thereto also deforms. This deformation causes distortion to occur in an optical fiber constituting the optical fiber sensor 201, thus causing the PV vector to change. A PV-vector threshold value is set in advance in the PV vector calculating device 105. By setting an alarm to go off when, for example, a change in the PV vector that exceeds the threshold value is observed, the alarm provides a notification that a certain kind of abnormality (such as trespassing of an intruder over the fence) has occurred at the fence 202.

The PV vector measuring apparatus according to the embodiment of the present invention can detect a change in birefringence of a measurement object, such as an optical fiber, with high accuracy so as to allow for intrusion detection with reduced frequency of false alarms.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. A polarization velocity vector measuring apparatus comprising:
    a light source configured to output probe light;
    a polarization switch configured to alternately switch between two orthogonal states of polarization of the probe light and output measurement probe light;
    a polarimeter configured to measure time dependency of a state-of-polarization vector of output light output from a measurement object that has received the measurement probe light; and
    a polarization-velocity-vector calculating device configured to calculate a characteristic vector, which expresses a rate of polarization change in the measurement object, from the time dependency of the state-of-polarization vector,
    wherein the polarization-velocity-vector calculating device calculates a polarization-velocity-vector outer-product operator vx provided by formula (1) below from a Mueller matrix R(t) of the measurement object and determines a polarization velocity vector v ($v_1$, $v_2$, $v_3$) from a matrix component that provides the polarization-velocity-vector outer-product operator:

$$\vec{v}x = \left\{\frac{\partial}{\partial t}R(t)\right\}R^\dagger(t) = \begin{bmatrix} 0 & -v_3 & v_2 \\ v_3 & 0 & -v_1 \\ -v_2 & v_1 & 0 \end{bmatrix}. \quad (1)$$

2. A polarization velocity vector measuring method executed in the polarization velocity vector measuring apparatus according to claim 1, the polarization velocity vector measuring method comprising:
   inputting the probe light to the polarization switch, alternately switching a state of polarization of the probe light input to the polarization switch between two orthogonal states of polarization and outputting the measurement probe light, and inputting the measurement probe light to the measurement object;
   measuring a state-of-polarization vector of output light output from the measurement object in an oscilloscope mode by using the polarimeter and storing the state-of-polarization vector into the polarization-velocity-vector calculating device;
   determining time dependency of the state-of-polarization vector by splitting the state-of-polarization vector stored in the polarization-velocity-vector calculating device into state-of-polarization vectors corresponding to the two orthogonal states of polarization of the measurement probe light, and determining a Mueller matrix R(t) of the measurement object from the time dependency of the state-of-polarization vector; and
   calculating a polarization-velocity-vector outer-product operator vx provided by formula (1) below from the Mueller matrix R(t) and determining a polarization velocity vector v ($v_1$, $v_2$, $v_3$) from a matrix component that provides the polarization-velocity-vector outer-product operator:

$$\vec{v}x = \left\{\frac{\partial}{\partial t}R(t)\right\}R^\dagger(t) = \begin{bmatrix} 0 & -v_3 & v_2 \\ v_3 & 0 & -v_1 \\ -v_2 & v_1 & 0 \end{bmatrix}. \quad (1)$$

3. The polarization velocity vector measuring method according to claim 2, further comprising changing a wavelength of the light source, determining the polarization velocity vector for each wavelength, and measuring wavelength dependency of the polarization velocity vector.

4. A polarization velocity vector measuring apparatus comprising:
   a light source configured to output probe light;
   a polarization switch configured to alternately switch between two orthogonal states of polarization of the probe light and output measurement probe light;
   a polarimeter configured to measure time dependency of a state-of-polarization vector of output light output from a measurement object that has received the measurement probe light; and
   a polarization-velocity-vector calculating device configured to calculate a characteristic vector, which expresses a rate of polarization change in the measurement object, from the time dependency of the state-of-polarization vector,
   wherein the polarization-velocity-vector calculating device calculates a polarization-change operator H(t) provided by formula (2) below from a rotation matrix U(t) belonging to a special unitary group SU(2) divided by a common phase of a Jones matrix of the measurement object, and determines a polarization velocity vector v ($v_1$, $v_2$, $v_3$) from a matrix component that provides the polarization-change operator:

$$H(t) \equiv i\left\{\frac{\partial}{\partial t}U(t)\right\}U^\dagger(t) \quad (2)$$
$$= \frac{1}{2}\sum_{m=1}^{3} v_m(t)\sigma_m = \frac{1}{2}\begin{bmatrix} v_1(t) & v_2(t) - iv_3(t) \\ v_2(t) + iv_3(t) & -v_1(t) \end{bmatrix}$$

wherein $\sigma_m$ denotes a Pauli matrix and m denotes a parameter that may be any of integers 1, 2, and 3.

5. A polarization velocity vector measuring method executed in the polarization velocity vector measuring apparatus according to claim 4, the polarization velocity vector measuring method comprising:
   inputting the probe light to the polarization switch, alternately switching a state of polarization of the probe light input to the polarization switch between two orthogonal states of polarization and outputting the measurement probe light, and inputting the measurement probe light to the measurement object;
   measuring time dependency of a state-of-polarization vector of output light output from the measurement object in an oscilloscope mode by using the polarimeter and storing the time dependency of the state-of-polarization vector into the polarization-velocity-vector calculating device;
   determining the time dependency of the state-of-polarization vector by splitting the state-of-polarization vector stored in the polarization-velocity-vector calculating device into state-of-polarization vectors corresponding to the two orthogonal states of polarization of the measurement probe light, and determining a rotation matrix U(t) belonging to a special unitary group SU(2) divided by a common phase of a Jones matrix of the measurement object from the time dependency of the state-of-polarization vector; and
   calculating a polarization-change operator H(t) provided by formula (2) below from the rotation matrix U(t) of the measurement object and determining a polarization velocity vector v ($v_1$, $v_2$, $v_3$) from a matrix component that provides the polarization-change operator:

$$H(t) \equiv i\left\{\frac{\partial}{\partial t}U(t)\right\}U^\dagger(t) \quad (2)$$
$$= \frac{1}{2}\sum_{m=1}^{3} v_m(t)\sigma_m = \frac{1}{2}\begin{bmatrix} v_1(t) & v_2(t) - iv_3(t) \\ v_2(t) + iv_3(t) & -v_1(t) \end{bmatrix}$$

wherein $\sigma_m$ denotes a Pauli matrix and m denotes a parameter that may be any of integers 1, 2, and 3.

* * * * *